United States Patent [19]

Okuyama et al.

[11] Patent Number: 5,537,545
[45] Date of Patent: Jul. 16, 1996

[54] SYSTEM FOR CONTROLLING COOPERATIONS AMONG A PLURALITY OF TERMINALS CONNECTED TO A NETWORK WHEREBY EACH TERMINAL CAN BE SWITCHED FROM COOPERATIVE TO INDIVIDUAL OPERATION MODE

[75] Inventors: Satoshi Okuyama; Toshimitsu Suzuki; Yu Minakuchi; Katsutoshi Yano, all of Kawasaki, Japan

[73] Assignee: Fujitsu Limited, Kawasaki, Japan

[21] Appl. No.: 278,156

[22] Filed: Jul. 21, 1994

[30] Foreign Application Priority Data

Jul. 26, 1993 [JP] Japan ................................ 5-184146

[51] Int. Cl.⁶ ...................................... G06F 15/16
[52] U.S. Cl. ................ 395/200.01; 395/200.12; 395/200.15; 395/800; 395/858; 364/229; 364/230; 364/242.94; 364/242.95; 364/931.4; 364/931.43; 364/940.6; 364/940.62; 364/942.03; 364/942.05; 364/948.32; 364/DIG. 2
[58] Field of Search ..................... 395/800, 700, 395/650, 325, 200, 200.01, 200.12, 200.15, 858; 364/DIG. 1, DIG. 2; 340/825.01–825.05

[56] References Cited

U.S. PATENT DOCUMENTS

| | | | |
|---|---|---|---|
| 3,970,993 | 7/1976 | Finnila ........................................ | 395/800 |
| 4,363,093 | 12/1982 | Davis et al. ............................ | 395/200.12 |
| 4,868,763 | 9/1989 | Matsui et al. ............................ | 364/513 |
| 4,910,669 | 3/1990 | Gorin et al. ............................ | 395/800 |
| 4,933,936 | 6/1990 | Rasmussen et al. .................... | 370/85.9 |
| 5,093,826 | 3/1992 | Leichum ................................. | 370/58.2 |
| 5,349,674 | 9/1994 | Calvert et al. ........................... | 395/800 |

OTHER PUBLICATIONS

Maria C. Yuang et al: "A Reliable and Parallel Double–Ring FDDI Metropolitan Area Network"; IEEE 1992, Infocom pp. 352–362.

Primary Examiner—Meng-Ai An
Attorney, Agent, or Firm—Staas & Halsey

[57] ABSTRACT

Each of a plurality of terminals includes a processing section, a cooperation controlling section and an inputting section. The inputting section inputs, to the cooperation controlling section, input data and switching data for switching over a cooperative operation mode and an individual operation mode. The switching section switches over the cooperative operation mode and the individual operation mode on the basis of the switching data given from the inputting section. The self-input processing section supplies, when in the cooperative operation mode, the input data from the self-inputting section to the self-processing section and other processing sections which should operate in cooperation and supplies, when in the individual operation mode, the input data from the self-inputting section to the self-processing section. The cooperation input processing section supplies, when in the cooperative operation mode, the self-processing section with input data from other processing sections but supplying, when in the individual operation mode, the self-processing section with no input data from the other processing section.

16 Claims, 12 Drawing Sheets

SYSTEM FOR CONTROLLING COOPERATIONS AMONG A PLURALITY OF TERMINALS CONNECTED TO A NETWORK WHEREBY EACH TERMINAL CAN BE SWITCHED FROM COOPERATIVE TO INDIVIDUAL OPERATION MODE

BACKGROUND OF THE INVENTION

The present invention relates to an apparatus for and a method of controlling cooperative operations, which work to simultaneously execute the same processing with cooperative operations of a plurality of terminals connected to a network.

With personalization of a computer system in recent years, an environment is going to be prepared, wherein a single person has one set of computer. Further, in this computer system, a plurality of computers are connected to a network such as a LAN (Local Area Network). Distributed processing of the data can be executed between the computers via the network. Under such circumstances, there is demanded such an environment that the same processing is simultaneously executed by the computer-to-computer cooperative operations by use of the computer system.

In a cooperative operation control apparatus for performing the cooperative operations, a plurality of terminals, e.g., the above computers, are connected to each other via the network. Each terminal is provided with a processing section for executing the processing of an application program. A cooperation controlling section for operating each processing section is provided corresponding to each processing section.

Each cooperation controlling section inputs user's input data to a self-terminal from a data inputting section such as a mouse or a keyboard. The cooperation controlling section simultaneously outputs the input data of the self-terminal to other terminal which should operate in cooperation. Then, each terminal supplies the input data to the processing section, thereby starting the above processing.

Subsequently, the data which should be used in common are distributed to each terminal during the cooperative operation of each processing section. Each processing section refers to the identical input data among items of the data which should be used in common. It is thus possible for the user to refer to or retrieve and update the identical input data.

Further, in other conventional cooperative operation control apparatuses, the cooperation controlling section temporarily transmits the input data of the self-terminal to an input server. Hereat, the input server having a right of control simultaneously outputs the input data of the self-terminal to other terminals which should operate in cooperation.

Each cooperation controlling section, however, causes each processing section to operate in cooperation all the time, and hence, the processing sections always use the same input data in common from the start of processing to the end thereof. For this reason, each cooperation controlling section can not, e.g., refer to other items of data among the data used in common. Alternatively, each cooperation controlling section can not individually make a memorandum. Further, it is impossible to perform operations such as a personal-base modification with respect to paper materials in a daily conference.

SUMMARY OF THE INVENTION

It is a primary object of the present invention to provide an apparatus for and a method of controlling cooperative operations, by which other items of data can be easily referred in the middle of each of a plurality of terminals using data in common.

An apparatus for controlling cooperative operations according to the present invention comprises a plurality of terminals, a switching section, a self-input processing section and a cooperation input processing section. Each terminal connected to a network includes a processing section for executing processes, a cooperation controlling section for operating the processing section and an inputting section for inputting, to the cooperation controlling section, an item of input data and an item of switching data for switching over a cooperative operation mode for causing the processing section to operate in cooperation and an individual operation mode for causing self-processing section to operate individually.

The switching section provided in each cooperation controlling section switches over the cooperative operation mode and the individual operation mode on the basis of the switching data given from the inputting section.

The self-input processing section provided in each cooperation controlling section supplies, when in the cooperative operation mode, the input data from the self-inputting section to the self-processing section and other processing section which should operate in cooperation and supplies, when in the individual operation mode, the input data from the self-inputting section to the self-processing section.

The cooperation input processing section provided in each cooperation controlling section supplies, when in the cooperative operation mode, the self-processing section with input data from other processing section but supplies, when in the individual operation mode, the self-processing section with no input data from the other processing section.

A method of controlling a cooperative operation according to the present invention comprises an inputting step, a switching step, a self-input processing step and a cooperation input processing step. The inputting step involves inputting an item of input data and an item of switching data for switching over a cooperative operation mode for causing a processing section to operate in cooperation that is provided in each of a plurality of terminals connected to a network and an individual operation mode for causing a self-processing section to individually operate. The switching step involves switching over the cooperative operation mode and the individual operation mode on the basis of the switching data from the inputting step.

The self-input processing step involves supplying, when in the cooperative operation mode, the input data from a self-inputting step to a self-processing section and other processing section which should operate in cooperation and supplying, when in the individual operation mode, the processing section with the input data from the self-inputting step.

The cooperation input processing step involves supplying, when in the cooperative operation mode, the self-processing section with the input data from the other processing section but supplying, when in the individual operation mode, the self-processing section with no input data from the other processing section.

Further, the cooperation input processing section includes a cooperation input storing section for storing, as items of cooperation input data, the input data from the self-inputting section and the input data from the other processing section.

The self-input processing section includes a self-input transmitting section and a self-input storing section. The self-input transmitting section transmits, when in the cooperative operation mode, the input data from the self-inputting section to the other processing section which should cooperate in cooperation. The self-input storing section stores, when in the individual operation mode, the input data as an item of individual input data from the self-inputting section and, at the same time, stores a backward flag indicating whether or not the individual input data stored therein can be read out by tracing back the individual input data and also a hysteresis number of the cooperation input data when starting the individual operation.

The switching section may include an input data displaying section for displaying a list of past modes when effecting a switchover to the individual operation mode.

The cooperation input storing section, when a value of the backward flag is set so that the individual input data can be read backward in the individual operation mode, sequentially stores the input data from the other processing section when the cooperative operation mode is switched over to the individual operation mode.

The self-input processing section, when the individual operation mode is restored to the cooperative operation mode, converts the individual input data into possible-of-backward-processing input data on the basis of the value of the backward flag and thus supplies the converted input data to the processing section.

The cooperation input processing section, when the individual operation mode is restored to the cooperative operation mode, returns to an individual operation starting location of the cooperation input storing section on the basis of the cooperation input data hysteresis number. The cooperation input processing section sequentially supplies the processing section with the stored cooperation input data and thus attains the latest cooperative operation.

The same inputting process as the previous cooperative operation mode can be conducted.

Further, the cooperation input processing section, when the value of the backward flag is so set as to be impossible of tracing back the individual input data in the individual operation mode, informs the processing section of the input data to be initialized based on the value of the backward flag on the occasion of restoring from the individual operation mode to the cooperative operation mode. The cooperation input processing section supplies the processing section with the cooperation input data from the initial one to the latest one in sequence which have been stored in the cooperation input storing section, thereby restoring the processing to the latest cooperative operation.

Moreover, the self-input storing section includes a plurality of self-input hysteresis tables for storing the individual input data each time the individual operation is performed. The cooperation input processing section informs the processing section with the input data to be initialized when the inputting section gives a display indication of the past individual input data or when a predetermined or more items of individual input data are stored in the self-input hysteresis table. The cooperation input processing section supplies the processing section with the cooperation input data from the beginning up to a start of the past individual operation.

The self-input processing section performs the past individual operation by sequentially supplying the processing section with the past individual input data from a past individual operation starting location of the self-input hysteresis table.

Further, the self-input transmitting section provided in the self-terminal transmits, when in the individual operation mode, the individual input data of the self-terminal to other terminal. The cooperation input processing section provided in the other terminal stores, on receiving the individual input data, the self-input hysteresis table with the individual input data as new one individual mode. At the same time, the cooperation input processing section causes the input data displaying section to display the individual input data and a name of transmitter in the form of a list of the past individual mode.

Further, the self-input transmitting section provided in the self-terminal transmits the individual input data of the self-input hysteresis table to all other terminals which should operate in cooperation. The cooperation input processing sections provided in all other terminals which should operate in cooperation write, on receiving the individual input data, the same input data to the cooperation input hysteresis table and supply the processing section with the input data of the cooperation input hysteresis table. The switching section effects a switchover from the individual operation mode to the cooperative operation mode just when completing the supply of the input data.

Moreover, the self-input processing section, when the processing section executes multi-processes, starts a process exhibiting the same internal status as the cooperative operation oriented processing by way of individual operation oriented processing on the basis of an indication of the individual operation from the inputting section. The self-input processing section supplies only the self-processing section with the input data from the self-inputting section.

The cooperative operation oriented processing and the individual operation oriented processing are switched over by a changeover of selection of windows under a multi-window environment. When returning to the cooperative operation mode, the previous process may be operated on the multi-windows.

According to the present invention, when the switching data is inputted from the inputting section, the switching section switches over the cooperative operation mode and the individual operation mode in accordance with this item of switching data.

Next, the self-input processing section and the cooperation input processing section input the data about the cooperative operation mode or the individual operation mode form the switching section.

Then, the self-input processing section, when in the cooperative operation mode, supplies the input data from the self-inputting section to the self-processing section and other processing sections which should operate in cooperation. Further, the cooperation input processing section supplies the self-processing section with the input data from other processing sections.

On the other hand, the self-input processing section, when in the individual operation mode, supplies the self-processing section with the input data from the self-inputting section. Further, the cooperation input processing section does not supply the self-processing section with the input data from other processing sections.

That is, other items of data are processed individually when in the individual operation mode, and, it is therefore possible to easily individually refer to other items of data in the middle of using the data in common.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Specific embodiments of the present invention will hereinafter be described.

<Embodiment 1>

Figure 1:
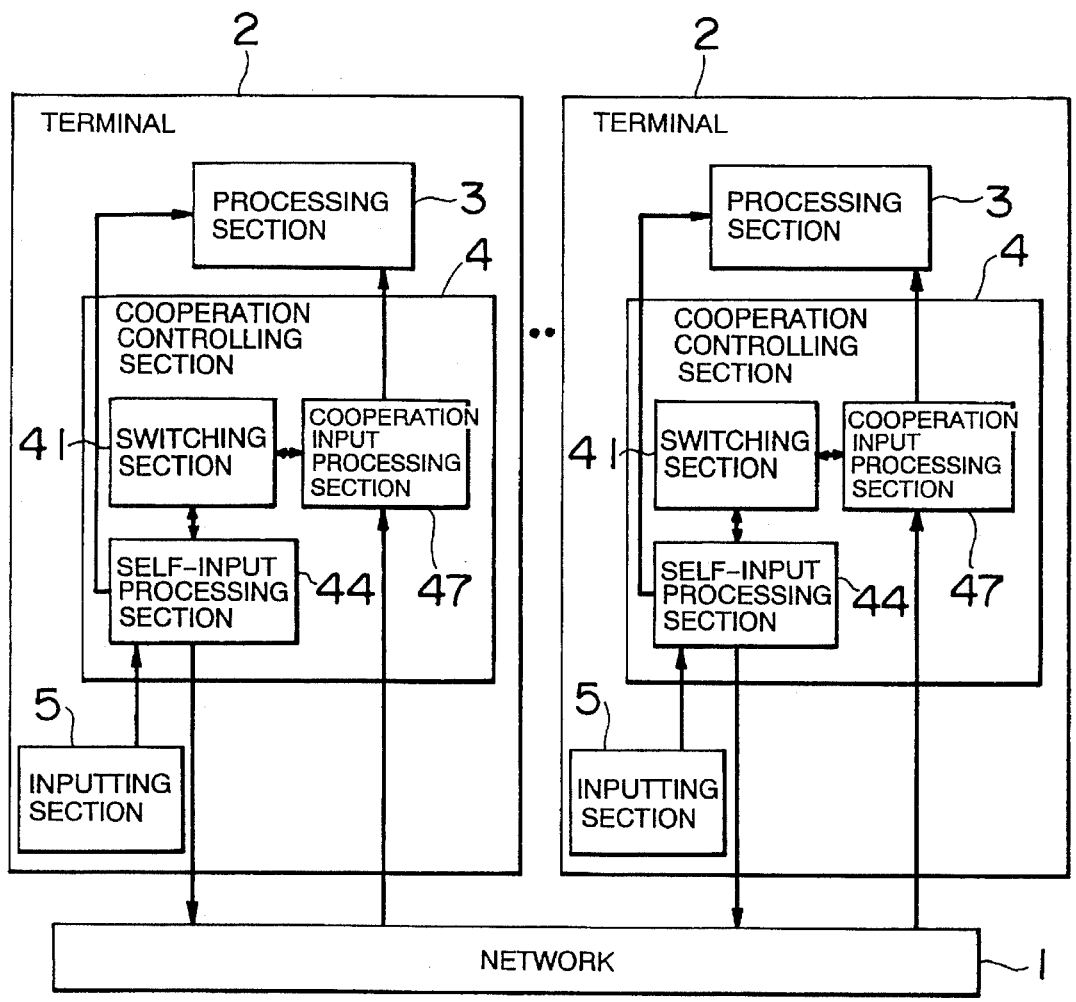
FIG. 1 is a block diagram illustrating a construction of a cooperative operation control apparatus in accordance with an embodiment 1 of this invention.

FIG. 1 is a block diagram illustrating a construction of a cooperative operation control apparatus in accordance with an embodiment 1 of this invention. The cooperative operation control apparatus in the embodiment 1 simultaneously executes the same processing with cooperative operations of a plurality of terminals connected to a network 1. The cooperative operation control apparatus comprises a plurality of terminals 2, a switching section 41, a self-input processing section 44 and a cooperative input processing section 47.

Each terminal 2 connected to a network 1 has a processing section 3, a cooperation controlling section 4 and an input section 5. The processing section 3 executes an application program. The cooperation controlling section 4 operates the above processing section 3. The input section 5 inputs switching data and input data to the cooperation controlling section 4. The switching data serve to switch over a cooperative operation mode for causing each processing section 3 to operate cooperatively and an individual operation mode for causing the self-processing section 3 to operate individually.

Each cooperation controlling section 4 comprises a switching section 41, a self-input processing section 44 connected to the switching section 41 and a cooperative input processing section 47 connected to the switching section 41. The switching section 41 switches over the cooperative operation mode and the individual operation mode on the basis of switching data given from the input section 3.

The self-input processing section 44 supplies, when in the cooperative operation mode, the input data from the self-input section 5 to the self-processing section 3 and other processing section 3 which should perform the cooperative operation. The self-input processing section 44 supplies, when in the individual operation mode, the self-processing section 3 with the input data from the self-input section 5.

The cooperative input processing section 47 supplies, when in the cooperative operation mode, the self-processing section 3 with the input data from the other processing section 3. The cooperative input processing section 47 does not supply, when in the individual operation mode, the self-processing section 3 with the input data from the other processing section 3.

Figure 2:
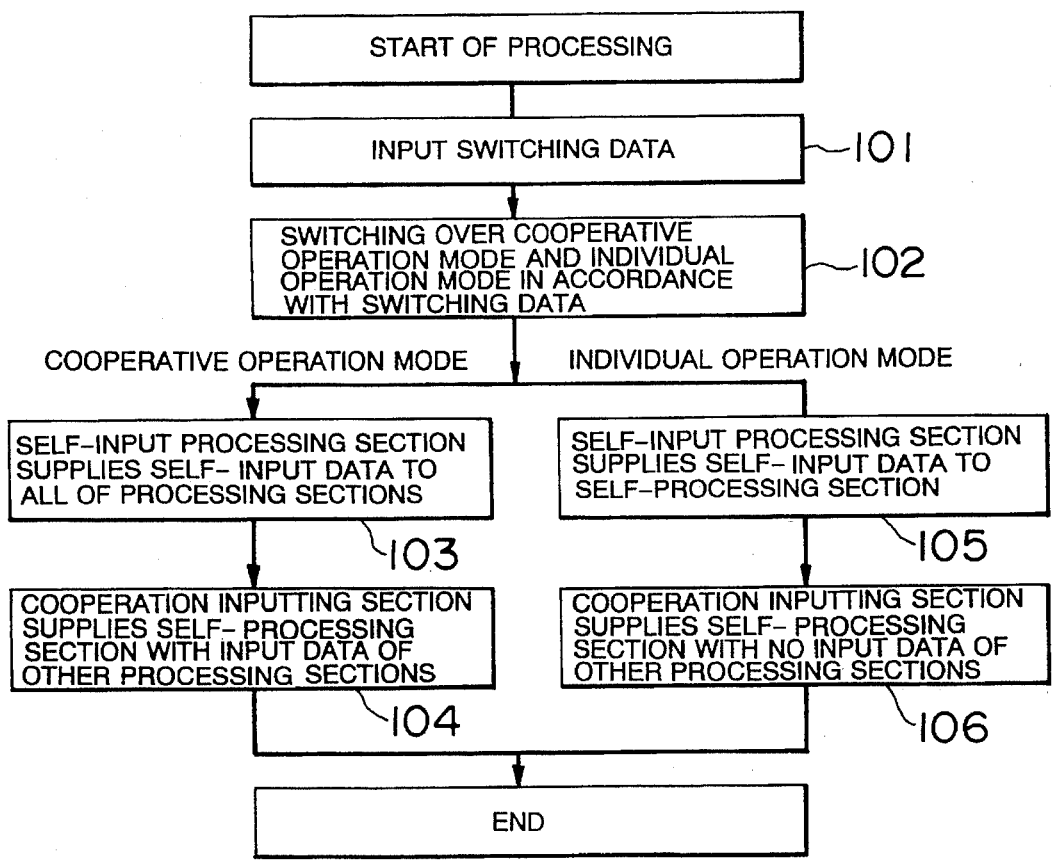
FIG. 2 is a flowchart showing a cooperative operation control method in accordance with the embodiment 1 of this invention.

FIG. 2 is a flowchart showing a cooperative operation control method in accordance with the embodiment 1 of this invention. The cooperative operation control method in accordance with the embodiment 1 will be explained referring to the drawings. At the first onset, when the switching data is inputted from the input section 5 (step 101), the switching section 41 switches over the cooperative operation mode and the individual operation mode on the basis of the switching data (step 102).

Next, the self-input processing section 44 and the cooperative input processing section 47 input data about the cooperative operation mode or the individual operation mode from the switching section 41. Then, when in the cooperative operation mode, the self-input processing section 44 supplies the input data from the self-input section 5 to the self-processing section 3 and the other processing section 3 which should operate cooperatively (step 103). Further, the cooperative input processing section 47 supplies the self-processing section 3 with the input data from the other processing section 3 (step 104).

On the other hand, when in the individual operation mode, the self-input processing section 44 supplies the self-processing section 3 with input data from the self-input section 5 (step 105). Further, the cooperative input processing section 47 does not supply the self-processing section 3 with the input data from the other processing section 3 (step 106).

That is, data of other elements are processed individually when in the individual operation mode and can be therefore easily referred individually in the middle of using the data in common.

Note that the processes of steps 103 and 104 may be reversed in terms of the order. Similarly, the processes of steps 105 and 106 may also be reversed in terms of the order.

<Embodiment 2>

Figure 3:
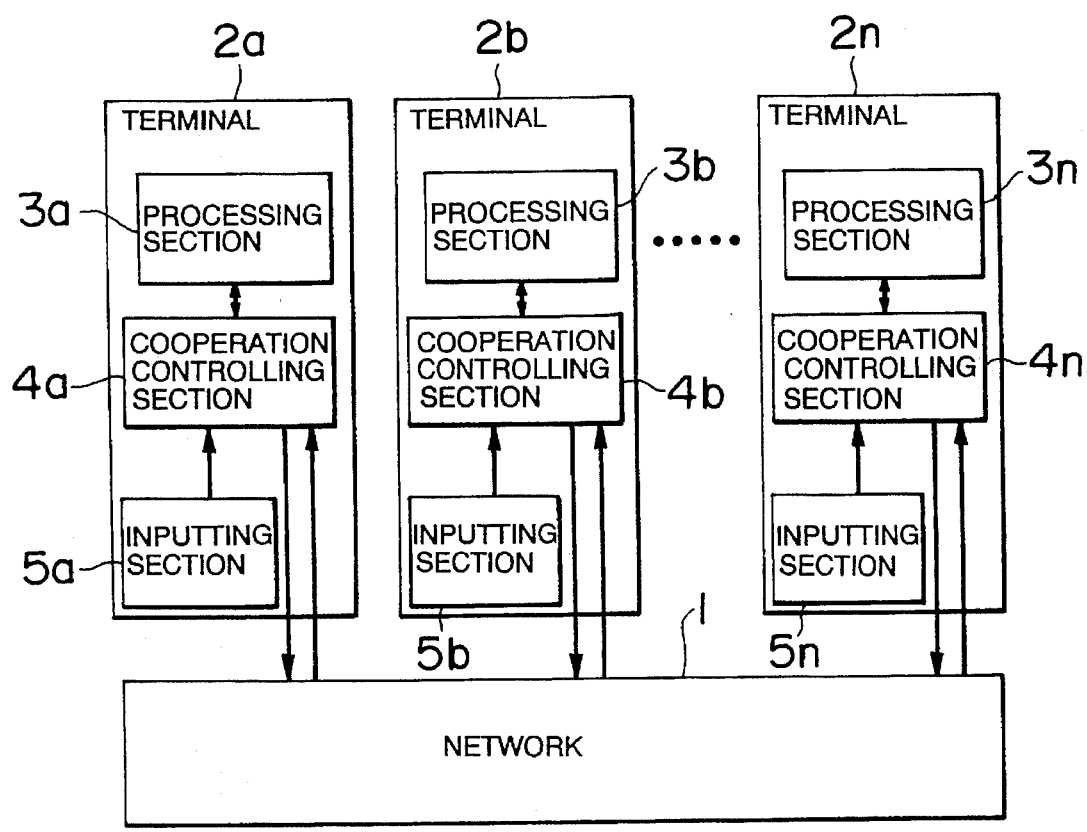
FIG. 3 is a block diagram illustrating a construction of the cooperative operation control apparatus in accordance with an embodiment 2 of this invention.

FIG. 3 is a block diagram illustrating a construction of the cooperative operation control apparatus in accordance with an embodiment 2 of this invention. The embodiment 2 presents a more specific construction than in the embodiment 1. The cooperative operation control apparatus comprises the network 1 and a plurality of terminals 2a–2n connected to the network 1.

Each of plurality of terminals 2a–2n consists of a computer, while the network 1 is a LAN, etc. The respective terminals 2a–2n include processing sections 3a–3n, cooperation controlling sections 4a–4n and input sections 5a–5n. The processing sections 3a–3n execute the same application program. The cooperation controlling sections 4a–4n operate the above processing sections 3a–3n. The input sections 5a–5n are mouses or keyboards connected to the cooperation controlling sections 4a–4n. The input sections 5a–5n input, to the corresponding cooperation controlling sections, the input data and the switching data about the cooperative operation mode and the individual operation mode which will be hereinbelow mentioned.

The cooperation controlling sections 4a–4n simultaneously transmit the input data to the processing sections 3a–3n which are to operate in cooperation, thereby causing the processing sections 3a–3n to execute the same processing, i.e., the same application program.

Figure 4:
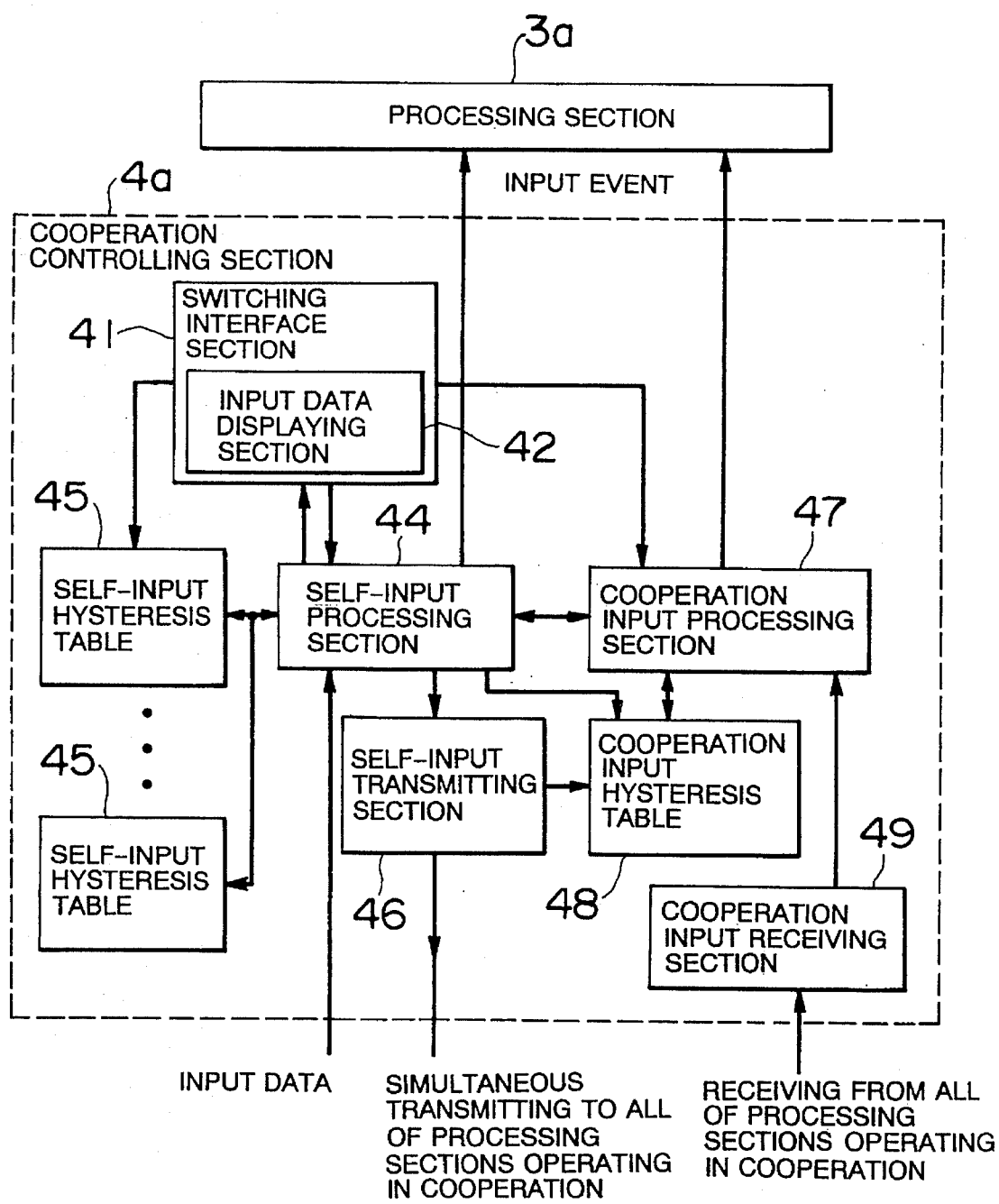
FIG. 4 is a block diagram illustrating a configuration of a cooperation controlling section of the embodiment 2.

FIG. 4 is a block diagram illustrating a construction of the cooperation controlling section. Shown herein is the construction of, e.g., the cooperation controlling section 4a among the plurality of cooperation controlling sections. Note that the constructions of other cooperation controlling sections are identical with that of the cooperation controlling section 4a, and, therefore their details will be omitted.

Each of the cooperation controlling sections 4a–4n comprises a switching interface section 41, a self-input processing section 44 and a plurality of self-input hysteresis tables 45. Each of the cooperation controlling sections 4a–4n includes a self-input transmitting section 46, a cooperative input processing section 47, a cooperative input hysteresis table 48 and a cooperation input receiving section 49.

The switching interface section 41 is connected to the self-input processing section 44, the plurality of self-input hysteresis tables 45 and the cooperation input processing section 47. The switching interface section 41 performs, when inputting a predetermined item of special key input data or special mouse input data from the self-input sections 5a–5n, a switchover to the individual operation mode or the cooperative operation mode. The switching interface section 41 controls the self-input processing section 44, the cooperative input processing section 47 and the plurality of self-input hysteresis tables 45 in accordance with the switched operation mode.

The self-input processing section 44, when in the cooperative mode, does not store the self-input hysteresis table 45 with the input data from the self-terminal but supplies the processing section 3 with the input data as an input event. The self-input processing section 44 simultaneously supplies the input events to the processing sections 3 of all other terminals which should operate in cooperation. The self-input transmitting section 46 is connected to the self-input processing section 44 and simultaneously transmits the self-input data to the terminals which should operate in cooperation.

The plurality of self-input hysteresis tables 45 store, when in the individual operation mode, a cooperative input data hysteresis number at the start of an individual operation and the input data from the self-terminals and a flag showing whether or not individual input data can be read backwards. Herein, the cooperative input data hysteresis number is a branch cooperative input data number (hereinafter simply termed a branch cooperation number) when effecting a switchover from the cooperative operation to the individual operation.

Figure 5:
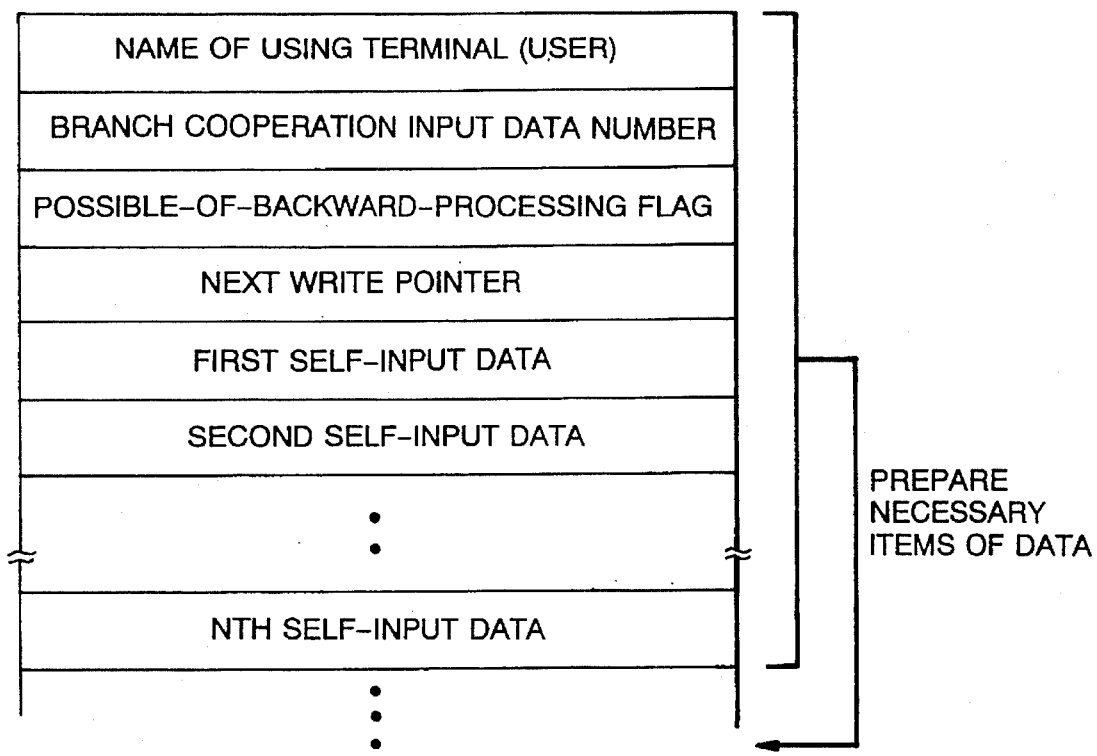
FIG. 5 is a diagram showing a self-input hysteresis table.

FIG. 5 is a diagram showing the self-input hysteresis table 45. As illustrated in FIG. 5, items of data such as a name of using terminal and a next write pointer in addition to the above data are stored in each self-input hysteresis table 45.

Note that each time the individual operation is conducted, the individual input data are stored in each self-input hysteresis table 45, and, hence, the individual input data in the past also exist.

Further, the self-input processing section 44, when in the individual operation mode, causes the self-input hysteresis table 45 to store data about the branch cooperation number at the start of the individual operation mode.

Figure 6:
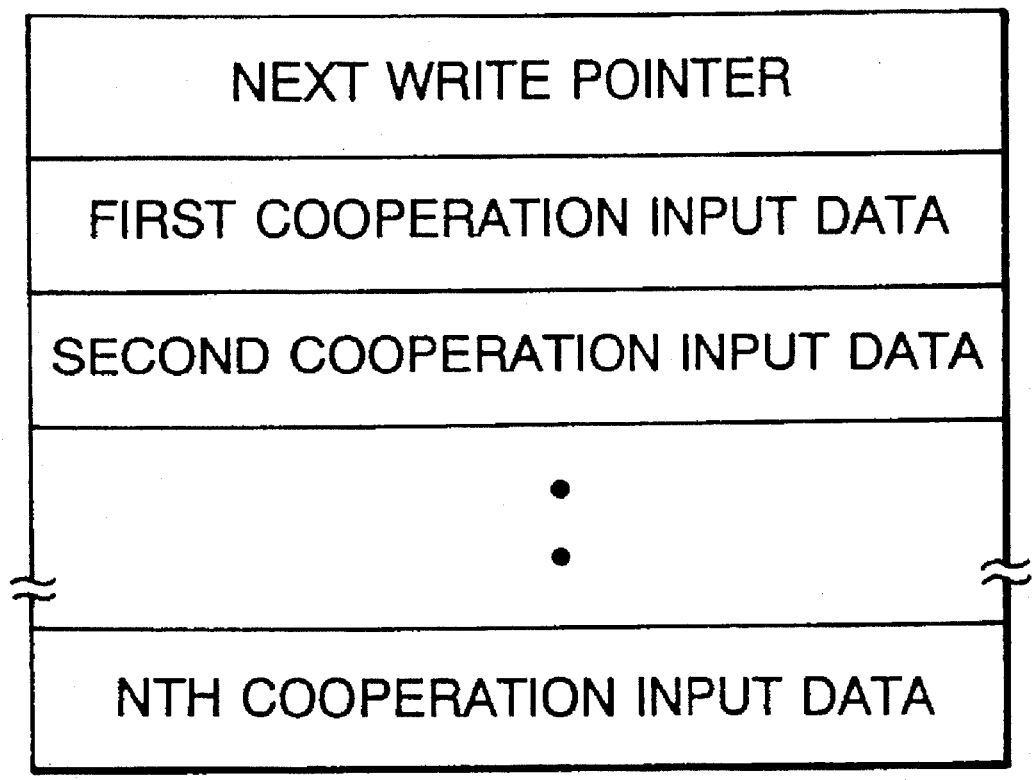
FIG. 6 is a diagram showing a cooperation input hysteresis table.

The cooperative input hysteresis table 48 stores all of the self-input data inputted from the self-terminal and the input data from the processing section 3 which should operate in cooperation. FIG. 6 is a diagram illustrating the cooperative input hysteresis table 48. As depicted in FIG. 6, the next write pointer is further stored in the cooperative input hysteresis table 48.

The cooperative input processing section 47 is connected to the self-input processing section 44. The cooperation input processing section 47, when in the cooperative operation mode, makes the cooperative input hysteresis table 48 sequentially store, as pieces of hysteresis data, the input data from the self-terminal and the input data from the processing section 3 which should operate in cooperation. These pieces of hysteresis data are supplied to the self-processing section 3.

Further, the cooperative input processing section 47, when in the individual operation mode, does not supply the self-processing section 3 with the input data from the processing section 3 which should operate in cooperation but stores the cooperation input hysteresis table 48 with all the input data in sequence.

These items of data may be stored in a memory or alternatively stored in files existing on a magnetic or optical disk.

Moreover, when returned from the individual mode again to the cooperative operation mode, the self-input processing section 44 repeatedly performs a process of supplying the self-processing section 3 with the input data backward to inputting by tracing back the self-input hysteresis table 45 up to a location where the individual operation is started.

In this case, the cooperative input processing section 47 supplies the self-processing section 3 with the input data inclusive of the latest one which have sequentially been stored in the cooperative input hysteresis table 48 from the individual operation starting position.

The cooperative input receiving section 49 receives the cooperative input data from other terminals that are on the cooperative operation and transmits the same data to the cooperative input processing section 47.

Further, the switching interface section 41 includes the input data display section 42 for individually displaying the individual input data when in the individual operation mode and cooperatively displaying the cooperative input data when in the cooperative operation mode.

<Cooperative Operation Control Method in Embodiment 2>

Given next is an explanation of the cooperative operation control method in accordance with the thus constructed embodiment 2. Herein, the control method will be described by dividing it into some cases.

Figure 7:
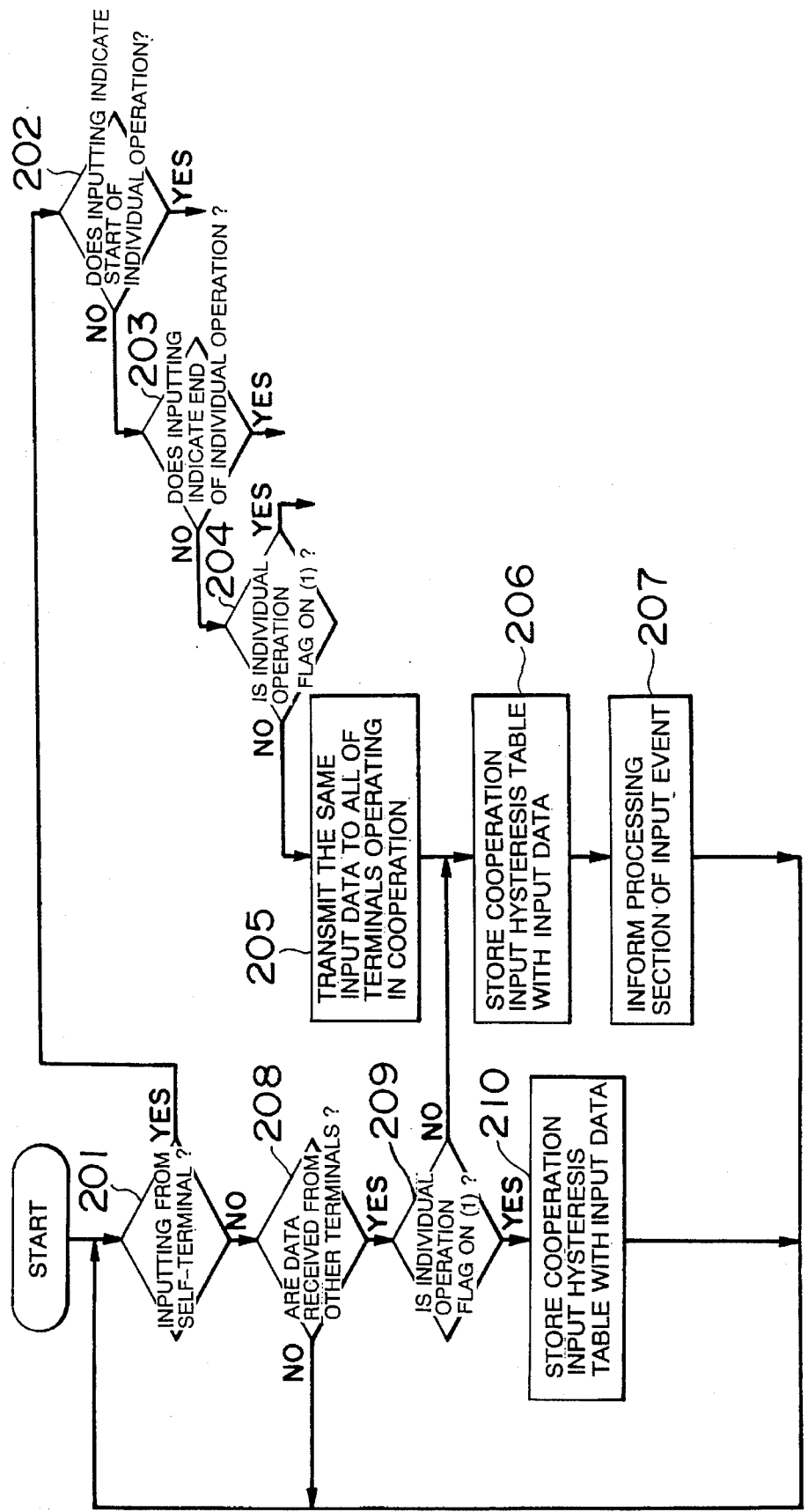
FIG. 7 is a flowchart showing actions during a cooperative operation in the embodiment 2 of this invention.

(1) First, the control method during the cooperative operation will be explained. FIG. 7 is a flowchart showing actions during the cooperative operation in the embodiment 2 of this invention.

The self-input processing sections 44a–44n distinguish whether or not the data are inputted from the self-input sections 5a–5n (step 201).

Herein, in the case of inputting the data, this implies that the self-input processing sections 44a–44n inputs the data from the self-terminals. Distinguished subsequently is whether or not the self-input processing sections 44a–44n input items of data indicating the start of the individual operation such as the special key input data or the special mouse input data (step 202). Next, when in the cooperative operation, there is distinguished whether or not the self-input processing sections 44a–44n input an item of data indicating an end of the individual operation (step 203).

Further, when in the cooperative operation, the self-input processing sections 44a–44n distinguish whether or not an individual operation flag is ON (step 204).

The individual operation flag is not ON when in the cooperative operation, and, therefore, the input data is given to the self-input transmitting section 46. Then, the self-input transmitting section 46 transmits the same input data as an item of cooperative input data to all the processing sections in other terminals which are operating in cooperation (step 205). The cooperative input data are sequentially stored in the cooperative input hysteresis table 48 (step 206).

Then, the self-processing sections 3 is informed of this item of data as an input event (step 207), and the action returns to the process of step 201.

On the other hand, in step 201, if the self-input processing sections 44a–44n do not input the data from the self-processing sections, there is distinguished whether or not the cooperative input processing section 47 receives the input from other terminals (step 208). Herein, when the cooperation input processing section 47 receives the cooperative input data from other terminals, whether or not the individual operation flag is ON is distinguished (step 209). When in the cooperative operation, the individual operation flag is OFF, and hence the action goes back to the process of sep 201 after performing the processes of steps 206 and 207.

In step 209, if the individual operation flag is ON, the input data are sequentially stored in the cooperative input hysteresis table 48 (step 210), and the action returns to the process of step 201.

Figure 8:
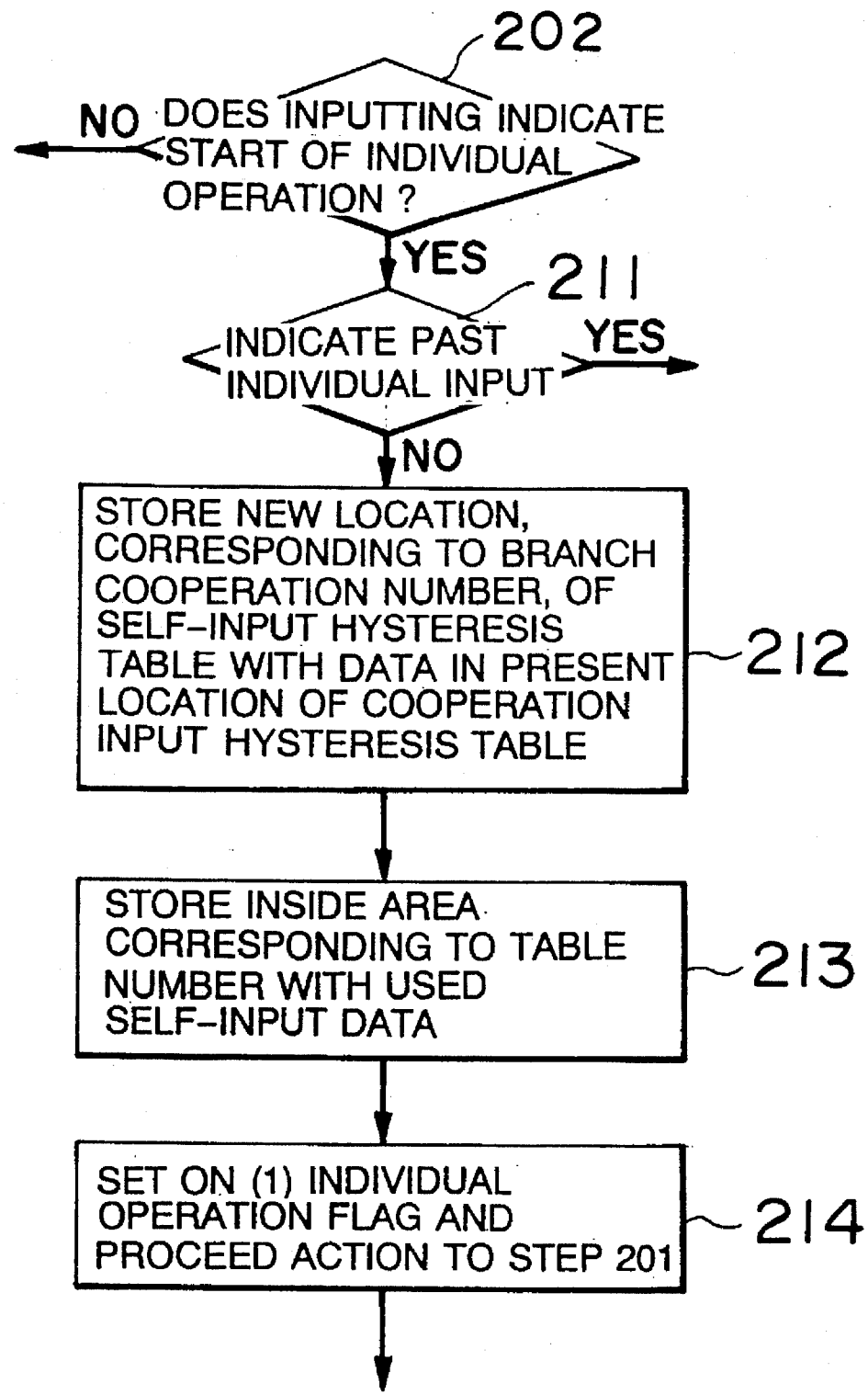
FIG. 8 is a flowchart showing actions of a switchover from the cooperative operation to the individual operation in the embodiment 2 of this invention.

(2) Next, an operation of switchover from the cooperative operation to the individual operation will be discussed. FIG. 8 is a flowchart showing the switching operation from the cooperative operation to the individual operation in the embodiment 2 of the present invention. At first, herein, in step 202, the self-input processing section 44 inputs the data indicating the start of the individual operation, i.e., the data about the switchover from the cooperative operation to the individual operation from the self-input section. Then, the switching interface section 41 effects switching from the cooperative operation mode to the individual operation mode from the present time on the basis of the switching data given from the self-input processing section 44.

Next, when the user inputs one of an individual input indication and a past individual input indication from the input section 5, the switching interface section 41 selects a content of the inputted indication (step 211).

Herein, when selecting the individual operation from the present cooperative operation, the switching interface section 41 informs the self-input processing section 44 and the cooperative input processing section 47 of the indication of the individual operation form the present time. The self-input processing section 44, when receiving the indication of the individual operation, stores a new location, corresponding to a branch cooperation number, of the self-input hysteresis table 45 with the data in the present location of the cooperative input hysteresis table 48 (step 212).

Then, if there exists the input data thereafter, the input data are supplied to the processing sections 3. Further, table numbers are stored in the interior so that the input data can be sequentially written from the locations of the self-input hysteresis table 45 where the individual input data have already been written (step 213). Subsequently, the individual operation flag is set ON, the action goes back to the process of step 201 (step 214).

Further, the cooperative input processing section 47 sequentially stores the cooperative input hysteresis table 48 with the cooperative input data as they are, which are transmitted from other in-cooperative-operation processing sections 3. This action corresponds to processing from step 209 to step 210.

Figure 9:
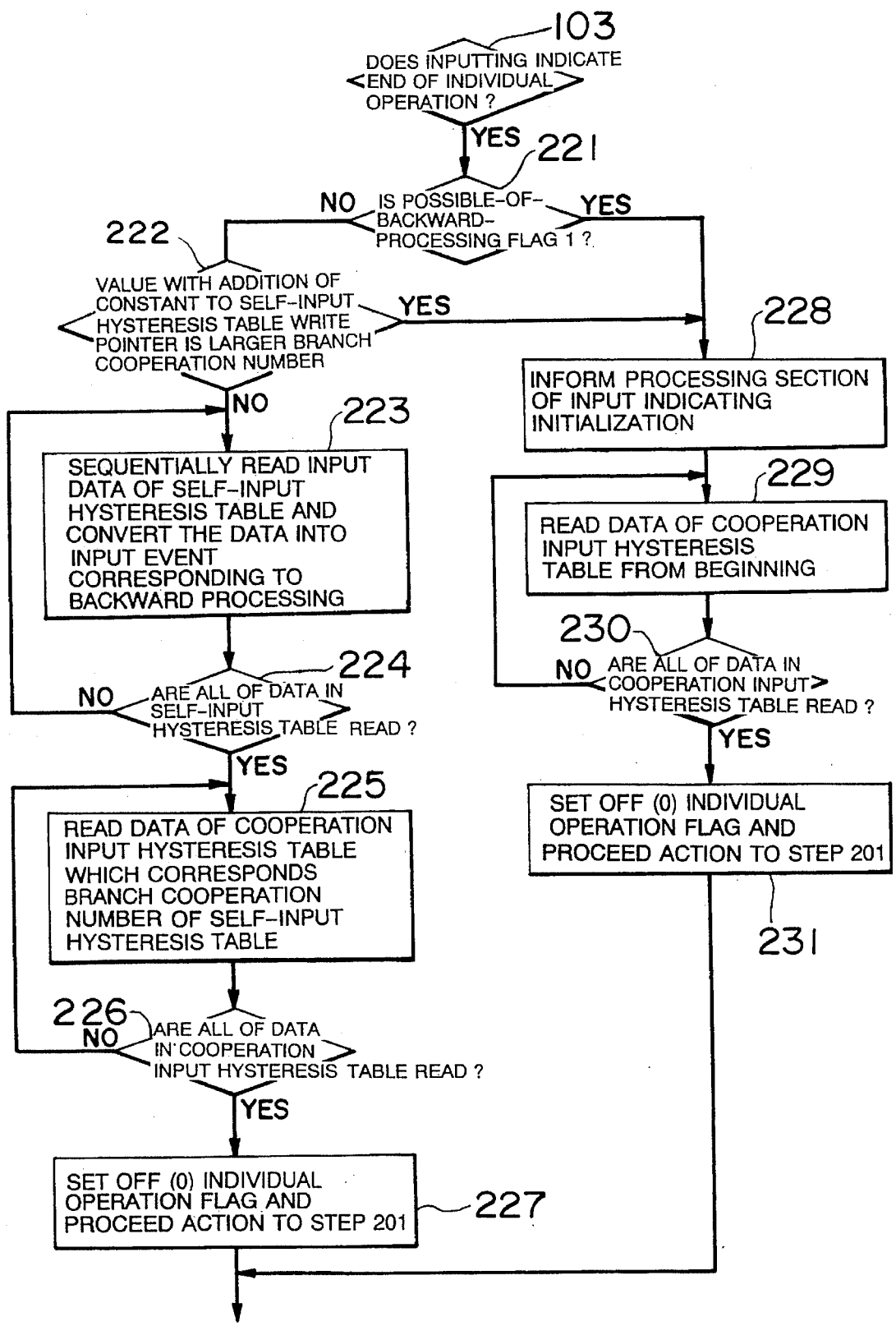
FIG. 9 is a flowchart showing actions of a switchover from the individual operation to the cooperative operation if the individual operation can be performed backward in the embodiment 2 of this invention.

(3). Next, there will be explained a switching operation from the individual operation to the cooperative operation when all the individual operations can be executed reversely (backward). FIG. 9 is a flowchart showing the switching operation from the individual operation to the cooperative operation when the individual operations can be effected backward in the embodiment 2 of the present invention.

To start with, the processes of steps 201 and 202 are conducted. Herein, if the self-input processing section 44 does not input the data indicating the start of the individual operation, there is distinguished whether or not the data showing the end of the individual operation, viz., the data about the switchover from the individual operation to the cooperative operation is inputted (step 203). When the self-input processing section 44 accepts the data indicating the end of the individual operation, the switching process from the individual operation to the cooperative operation is conducted according to the flowchart shown in FIG. 9.

Referring to FIG. 9, first, the input section 5 informs the switching interface section 41 of the data indicating the end of the individual operation. Subsequently, the switching interface section 41 informs the self-input processing section 44 of an item of cooperative operation switching preparation data. Hereat, the self-input processing section 44 distinguishes whether or not a backward flag stored in the self-input hysteresis table 45 in use at present is '1' (step 221). For example, if the backward flag is not '1', the backward operation can be done.

Herein, if the backward flag is not '1', the self-input processing section 44 distinguishes whether or not a total value obtained by adding a constant to the relevant self-input hysteresis table write pointer is larger than a value of the branch cooperation number (step 222).

Whereas if the total value is smaller than the value of the branch cooperation number, the self-input processing section 44 sequentially reads the input data of that self-input hysteresis table 45. The self-input processing section 44 converts the input data thereof into an input event corresponding to the backward operation and thereafter supplies the input event to the processing section 3 (step 223).

The self-input processing section 44 distinguishes whether or not the all the input data in the self-input hysteresis table 45 are read out (step 224). The self-input processing section 44, when reading all the input data, informs the switching interface section 41 of an completion of the preparation together with the branch cooperation number in the self-input hysteresis table 45.

Next, the switching interface section 41 gives a request for proceeding the process up to a present status by supplying the branch cooperation number to the cooperation input processing section 47.

The cooperation input processing section 47 reads the input data in sequence from the branch cooperation number of the cooperation input hysteresis table 48 and supplies the input data to the processing section 3 (step 225). The cooperation input processing section 47 distinguishes whether or not all the input data from the initial one to the latest one inclusive within the cooperation input hysteresis table 48 are read out (step 226). The cooperation input processing section 47, when supplying all the input data to the processing section 3, sets the individual operation flag in the OFF status. Then, after sending the completion back to the switching interface section 41, the action returns to the process of step 201 (step 227).

The switching interface section 41 requests the self-input processing section 44 and the cooperation input processing section 47 to perform the cooperative operation. Further, the self-input processing section 44 and the cooperation input processing section 47 return to the latest cooperative operation by processing the input data during the cooperation operation described above.

(4) Explained next is the switching operation from the individual operation to the cooperative operation when the individual operation can not be effected backward. Subsequently, in step 221, the self-input processing section 44, when the backward flag of the presently employed self-input hysteresis table 45 is '1', informs the switching interface section 41 of the fact that the backward operation is impossible.

Alternatively, in step 222, if the total value obtained by adding the constant to the relevant input hysteresis table write pointer is larger than the value of the branch cooperation number, the self-input processing section 44 informs the switching interface section 41 of the fact that the backward operation is impossible. That is, this is the case where the action to displaying is faster by tracing the cooperation input data from the beginning than by tracing back the individual input data.

Then, the switching interface section 41 requests the cooperation input processing section 47 to restore the latest cooperative status by initialization. The cooperation input processing section 47 informs each of the processing sections 3 of the input data indicating the predetermined initialization (step 228). The cooperation input processing section 47 supplies the processing section 3 with the from-beginning-to-latest input data of the cooperation input hysteresis table 48 (step 229).

The cooperation input processing section 47 distinguishes whether or not all the input data within the cooperation input hysteresis table 48 are read out (step 230). When supplying all the input data, the cooperation input processing section 47 sets the individual operation flag in the OFF-status. Then, the action returns to step 201, wherein the completion is sent back to the switching interface section 41 (step 231). The processing thereafter is brought into the cooperative operation status in the same way as the switchover from the individual operation to the cooperative operation if possible of the backward operation.

Figure 10:
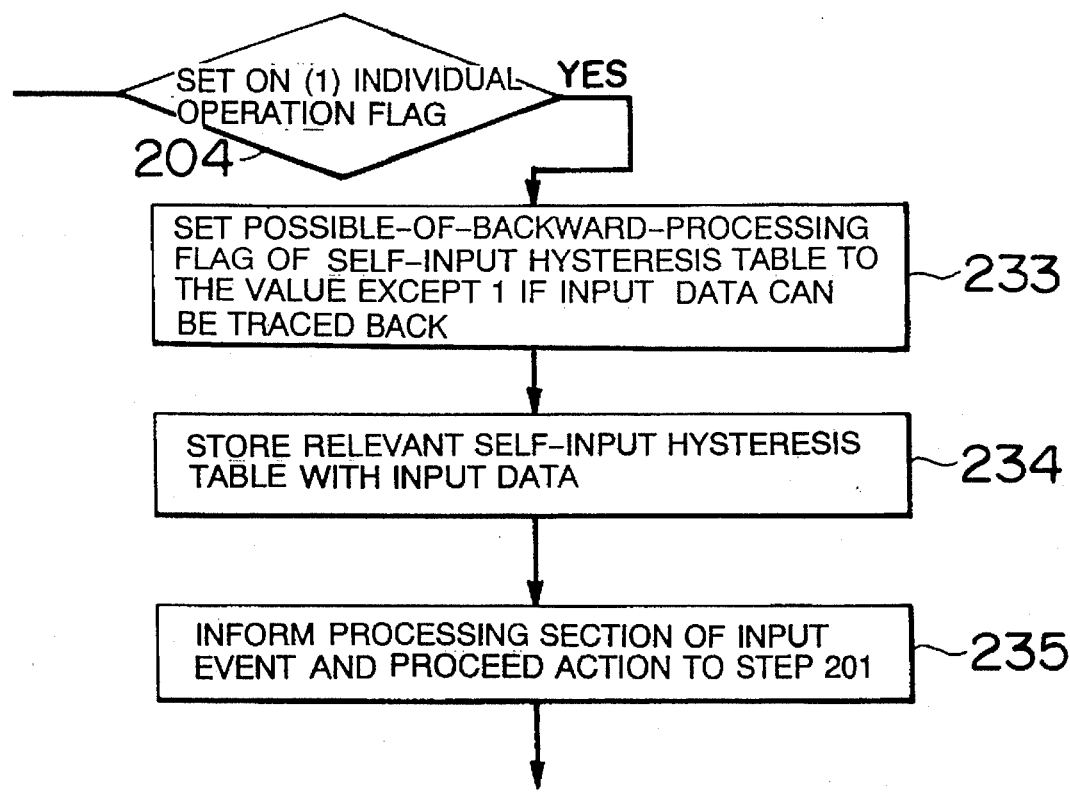
FIG. 10 is a flowchart showing a case where an individual operation flag is ON in the embodiment 2 of this invention.

Incidentally, it may happens that there is no input to indicate the end of the individual operation in step 203, and the individual operation flag is ON in step 204. In this case, as shown in FIG. 10, when the input data can be traced back, a possible-of-backward-processing flag of the self-input hysteresis table 45 is set to the value except '1' (step 233).

Then, the input data is stored in the relevant input hysteresis table 45 (step 234), and further the processing section 3 is informed of this input data as an input event (step 235).

Figure 11:
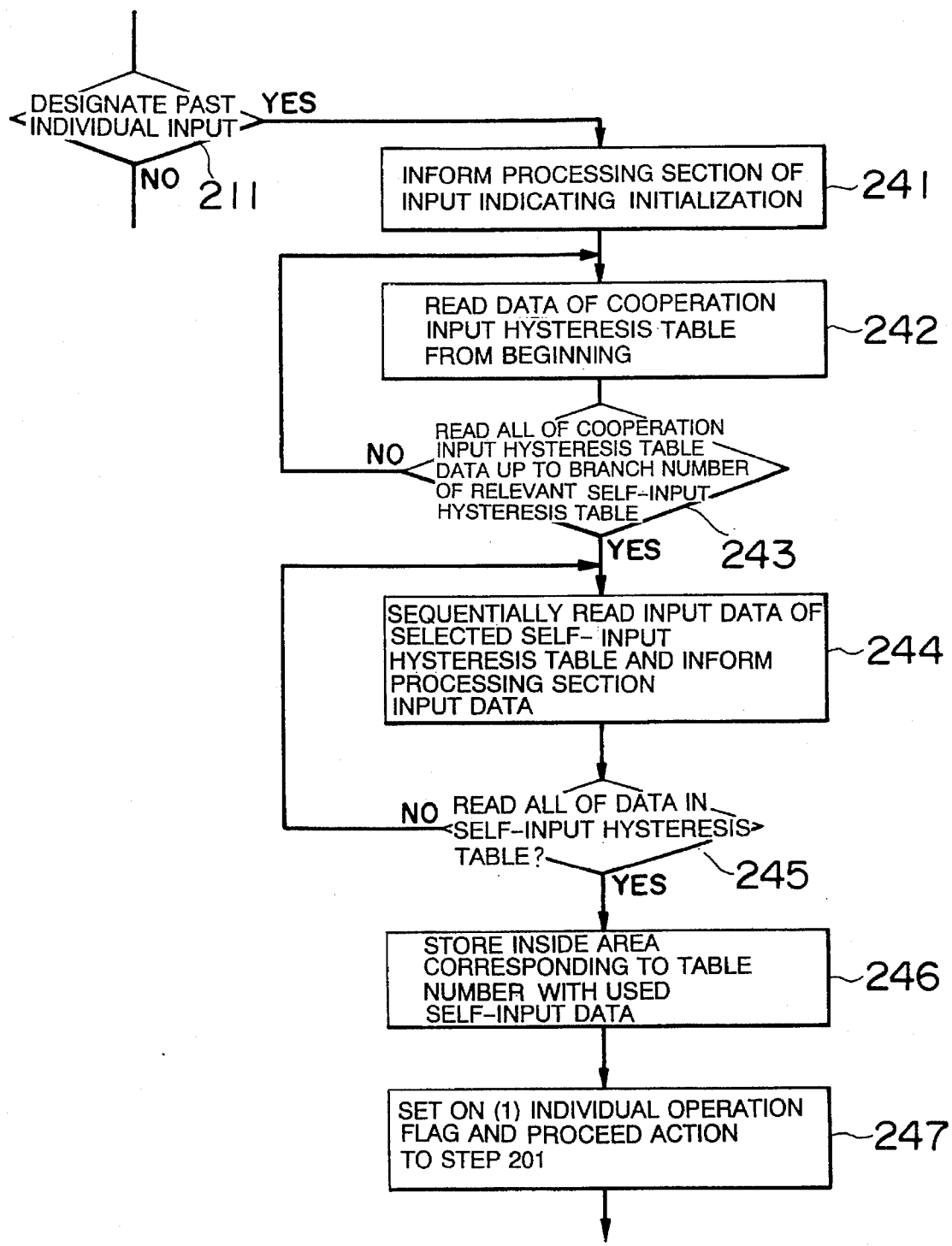
FIG. 11 is a flowchart showing actions of a shift from the cooperative operation to the past individual operation in the embodiment 2 of this invention.

(5) There will next be explained a shifting operation from the cooperative operation to the past individual operation. FIG. 11 is a flowchart showing the shifting operation from the cooperative operation to the past individual operation in the embodiment 2 of the present invention.

On the other hand, in step 202, when the input data showing the start of the individual operation is inputted, the input data displaying section 42 within the switching interface section 41 displays a menu with reference to the self-input hysteresis table 45 in step 211. Herein, when the past individual input data is selected from the menu, the past individual operation is performed in accordance with the flowchart shown in FIG. 11.

Turning to FIG. 11, first, the switching interface section 41 supplies the cooperation input processing section 47 with the branch cooperation number stored in the selected self-input hysteresis table 45. The switching interface section 41 then instructs the cooperation input processing section 47 to provide the processing section 3 with the cooperation input data up to the above branch cooperation number by the initialization. Thereupon, the cooperation input processing section 47 supplies the processing section 3 with the input data indicating the initialization (step 241).

Then, then cooperation input processing section 47 reads the cooperation input data stored in the cooperation input hysteresis table 48 from the beginning and supplies the same data to the processing section 3 (step 242). Further, the cooperation input processing section 47 distinguishes whether or not all the cooperation input data of the cooperation input hysteresis table 48 are read out up to the branch cooperation number of the relevant self-input hysteresis table 45 (step 243).

When all the cooperation input data are read out, the switching interface section 41 provides the self-input processing section 44 with a table number for identifying the selected self-input hysteresis table 45. Then, the self-input processing section 44 reads the input data of the relevant self-input hysteresis table 45 and sequentially supplies the same input data to the processing section 3 (step 244).

Distinguished subsequently is whether or not all the input data in the relevant self-input hysteresis table 45 are read out (step 245). When all the input data are read out, a self-input data table number employed is stored in the interior (step 246).

Next, the switching interface section 41 sets the individual operation flag in the ON-status and instructs the self-input processing section 44 and the cooperation input processing section 47 to effect the individual operation. Further, the individual process is started by executing each of the input processes as shown in the operation of switchover from the above cooperative operation to the individual operation.

Figure 12:
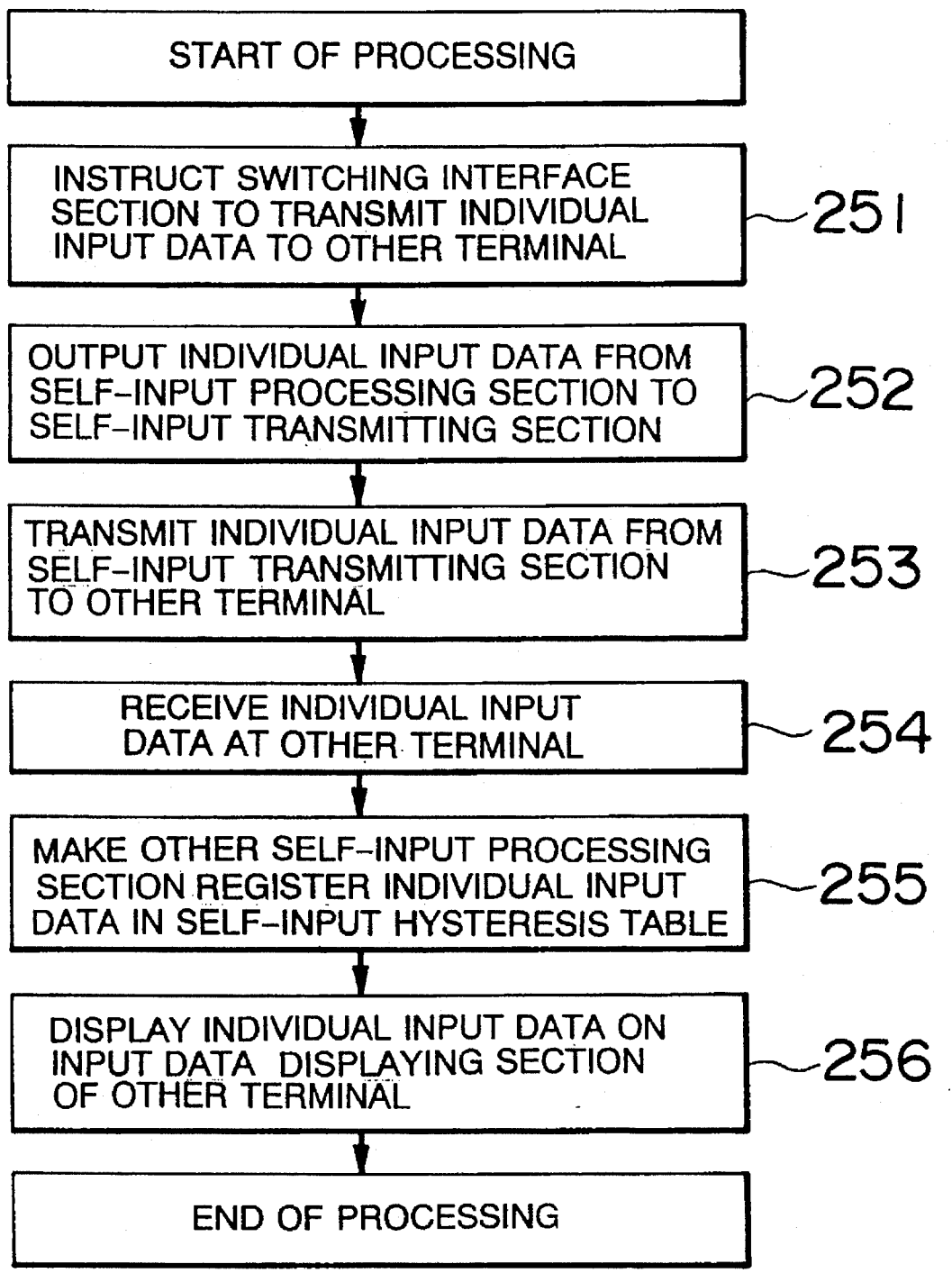
FIG. 12 is a flowchart showing actions of displaying individual input data on other terminals.

(6) Explained next is a case where other terminals display the individual input data. FIG. 12 is a flowchart showing such an operation that the individual input data are displayed on other terminals. In step 202, after inputting an item of data indicating the start of the individual operation, the switching interface section 41 refers to the self-input hysteresis table 45. Then, the switching interface section 41 causes the input data displaying section 42 to display a menu and selects a transmission of a certain item of individual input data to other terminal. Then, the switching interface section 41 instructs the self-input processing section 44 to transmit a relevant identifier of the self-input hysteresis table 45 to a partner terminal (step 251).

The self-input processing section 44 reads and supplies one set of relevant self-input hysteresis table 45 to the self-input transmitting section 46 so as to effect a transmission (step 252).

The self-input transmitting section 44 compiles and transmits an external individual operation data message (step 253). When other cooperation input processing section 47 receives the message (step 254), a piece of information to register the message is given to the self-input processing section 44. The other self-input processing section 44 sets the individual input data in an unoccupied area of the self-input hysteresis table 45 (step 255). Further, this individual input data is displayed on the input data displaying section 42 of the other terminal (step 256).

When the self-input hysteresis table 45 is newly used in this way, an in-use terminal thereof or a name of the user is set. When the input data displaying section 42 of the switching interface section 41 displays a menu, the in-use terminal or the like is displayed together. It is thereby possible to refer to the individual data as seen from a different terminal.

Note that the present invention is not confined to the above embodiment 2. When writing the data in the individual operation, the shift from the individual operation to the cooperative operation is, for instance, processed as follows.

To begin with, after being switched over to the individual operation, the input data displaying section 42 within the switching interface section 41 displays the menu by referring to the self-input hysteresis table 45. Then, when a certain item of individual input data is selectively switched over to the cooperative operation, the switching interface section 41 instructs the self-input processing section 46 to transmit a branch cooperation number defined as a relevant identifier to all the cooperative partners.

The self-input processing section 44 reads and supplies one set of relevant self-input hysteresis table 45 to the self-input transmitting section 46 so as to effect a transmission. The self-input transmitting section 46 compiles and transmits a cooperative operation switching message.

When the cooperation input processing section 47 receives the message, the transmitted self-input data among items of transmitted data is stored in an area posterior to the branch cooperation number with respect to the cooperation input hysteresis table 48.

Then, the cooperation input processing section 47, after transferring an item of initialization input data to the processing section 3, supplies the processing section 3 with the input data of the cooperation input hysteresis table 48 from the initial one to the latest one in sequence. With this processing, the individual operation can be thus switched over to the cooperative operation from a certain point of time.

Herein, when the individual operation is switched over to the cooperative operation, a certain specified person forcibly switches over the operation, or everybody arbitrarily performs the switchover. Alternatively, there may be taken a variety of methods such as effecting the switchover under the confirmation of all the cooperation processing sections.

Moreover, if the terminal performs multi-processes, the individual operation can be also done. For example, in the switchover from the cooperative operation to the individual operation, when conducting the individual operation from the present position, the self-input processing section 44 starts the same process having the same internal status with the cooperative operation process as an individual operation process from that time.

Then, the self-input processing section 44 transfers the input data of the self-terminal to only the self-processing section 3 but does not transmit the data to other terminals.

In this case, the self-input transmitting section 46 and the cooperation input processing section 47 operate in the individual operation status shown in the switchover from the cooperative operation to the individual operation. Herein, the cooperative operation is continuously executed in the previous process, and hence no restoration is required.

In this instance, if the individual operation is once finished, there comes out such a constraint that the previous individual status can not be reproduced afterward.

According to the present invention, when a plurality of users retrieve, refer to and update the common data, other items of data of the user's own can be referred in the middle of using the data in common. Alternatively, it is possible to easily save a memorandum of the user's own. For example, a video conference using flexible electronic data can be performed.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for controlling cooperative operations, comprising:

a plurality of terminals, each of said terminals including:
        (a) processing means for executing processes;
        (b) cooperation controlling means for operating said processing means; and
        (c) inputting means for inputting, to said cooperation controlling means, an item of input data and an item of switching data for switching over a cooperative operation mode for causing said processing means to operate in cooperation and an individual operation mode for causing processing means to operate individually, said plurality of terminals being connected to a network, switching means, provided in each of said cooperation controlling means, for switching over the cooperative operation mode and the individual operation mode based on of the switching data given from said inputting means;

self-input processing means, provided in each of said cooperation controlling means, for supplying, when in the cooperative operation mode, the input data from said inputting means to said processing means and other processing means which should operate in cooperation and supplying, when in the individual operation mode, the input data from said inputting means to said processing means; and cooperation input processing means, provided in each of said cooperation controlling means, for supplying, when in the cooperative operation mode, said processing means with input data from other processing means, but supplying, when in the individual operation mode, said processing means with no input data from said other processing means.

2. An apparatus according to claim 1, wherein said cooperation input processing means includes cooperation input storing means for storing, as items of cooperation input data, the input data from inputting means and the input data from said other processing means, wherein said self-input processing means includes:

self-input transmitting means for transmitting, when in the cooperative operation mode, the input data from said inputting means to said other processing means; and self-input storing means for storing, when in the individual operation mode, the input data as an item of individual input data from said inputting means, and simultaneously storing a backward flag indicating whether or not the individual input data stored therein can be read out by tracing back the individual input data and also a hysteresis number of the cooperation input data when starting the individual operation, and wherein said switching means includes input data displaying means for displaying a list of a past cooperative operation mode and a past individual operation mode when affecting a switchover to the individual operation mode.

3. An apparatus according to claim 2, wherein said cooperation input storing means, when a value of the backward flag is set so that the individual input data can be read backward in the individual operation mode, sequentially stores the input data from said other processing means when the cooperative operation mode is switched over to the individual operation mode, wherein said self-input processing means, when the individual operation mode is restored to the cooperative operation mode, converts the individual input date into possible-of-backward-processing input data based on the value of the backward flag and thus supplies the converted input data to said processing means, and wherein said cooperation input processing means, when the individual operation mode is restored to the cooperative operation mode, returns to an individual operation starting location of said cooperation input storing means based on the hysteresis number of the cooperation input data, sequentially supplies said processing means with the stored cooperation input data and thus attains latest cooperative operation.

4. An apparatus according to claim 2, wherein said cooperation input processing means, when the value of the backward flag is so set as to be impossible of tracing back the individual input data in the individual operation mode, informs said processing means of the input data to be initialized based on the value of the backward flag on occasion of restoring from the individual operation mode to the cooperative operation mode and supplies said processing means with the cooperation input data from an initial one to latest one in sequence, which have been stored in said cooperation input storing means.

5. An apparatus according to claim 4, wherein said self-input storing means includes a plurality of self-input hysteresis means for storing the individual input data each time the individual operation is performed, wherein said cooperation input processing means informs said processing means with the input data to be initialized when said inputting means gives a display indication of past individual input data or when a predetermined or more items of individual input data are stored in said self-input hysteresis means and supplies said processing means with the cooperation input data from beginning up to a start of past individual operation, and wherein said self-input processing means performs the past individual operation by sequentially supplying said processing means with past individual input data from the past individual operation starting location of said self-input hysteresis means.

6. An apparatus according to claim 5, wherein said self-input transmitting means provided in said terminal transmits, when in the individual operation mode, the individual input data of said terminal to other terminal, and wherein said cooperation input processing means provided in said other terminal stores, on receiving the individual input data, said self-input hysteresis means with the individual input data as new one individual mode, and simultaneously causes said input data displaying means to display the individual input data and a name of transmitter in form of a list of a past individual operation mode.

7. An apparatus according to claim 6, wherein said apparatus further includes cooperation input hysteresis means for storing the cooperative input data;

wherein said self-input transmitting means provided in said terminal transmits the individual input data of said self-input hysteresis means to all other terminals which should operate in cooperation, wherein said cooperation input processing means provided in all said other terminals which should operate in cooperation write, on receiving the individual input data, same input data to said cooperation input hysteresis means and supplies said processing means with the input data of said cooperation input hysteresis means, and wherein said switching means effects a switchover from the individual operation mode to the cooperative operation mode just when completing the supply of the input data.

8. An apparatus according to claim 1, wherein said self-input processing means, when said processing means executes multi-processes, starts a process exhibiting same internal status as cooperative operation oriented processing by way of individual operation oriented processing based on the switching data inputted by the inputting means which indicates that the processor is operating in an individual operation mode and supplies only said self-processing means with the input data from said self-inputting means.

9. A method of controlling a cooperative operation, comprising:

an inputting step of inputting an item of input data and an item of switching data for switching over a cooperative operation mode for causing processing means to operate in cooperation that is provided in each of a plurality of terminals connected to a network and an individual operation mode for causing self-processing means to individually operate;

a switching step of switching over the cooperative operation mode and the individual operation mode based on the switching data from said inputting step;

a self-input processing step of supplying, when in the cooperative operation mode, the input data from a self-inputting step to self-processing means and other processing means which should operate in cooperation and supplying, when in the individual operation mode, said processing means with the input data from said self-inputting step; and a cooperation input processing step of supplying, when in the cooperative operation mode, said self-processing means with the input data from said other processing means but supplying, when in the individual operation mode, said self-processing means with no input data from said other processing means.

10. A method according to claim 9, wherein said cooperation input processing step includes a cooperation input storing step of storing, as items of cooperation input data, the input data from said self-inputting step and the input data from said other processing means, wherein said self-input processing step includes:

a self-input transmitting step of transmitting, when in the cooperative operation mode, the input data from said self-inputting step to said other processing means which should cooperate in cooperation; and a self-input storing step of storing, when in the individual mode, the input data a an item of individual input data from said self inputting step, and simultaneously storing a backward flag indicating whether or not the individual input data stored therein can be read out by tracing back the individual input data and also a hysteresis number of the cooperation input data when starting the individual operation, and wherein said switching step includes an input data displaying step of displaying a list of past modes when affecting a switchover to the individual operation mode.

11. A method according to claim 10, wherein said cooperation input storing step, when a value of the backward flag is set so that the individual input data can be read backward in the individual operation mode, involves sequentially storing the input data from said other processing means when the cooperative operation mode is switched over to the individual operation mode, wherein said self-input processing step, when the individual operation mode is restored to the cooperative operation mode, involves converting the individual input data into possible-of-backward-processing input data on the basis of the value of the backward flag and involves thus supplying the converted input data to said processing means, and wherein said cooperation input processing step, when the individual operation mode is restored to the cooperative operation mode, involves sequentially supplying said processing means with cooperation input data stored back to a start location of the individual operation of said cooperation input storing step based on the hysteresis number of the cooperation input data and thus attaining latest cooperative operation.

12. A method according to claim 10, wherein said cooperation input processing step, when the value of the backward flag is so set as to be impossible of tracing back the individual input data in the individual operation mode, involves informing said processing means of the input data to be initialized based on the value of the backward flag on an occasion of restoring from the individual operation mode to the cooperative operation mode and supplying said processing means with the stored cooperation input data from an initial one to latest one in sequence.

13. A method according to claim 12, wherein said self-input storing step involves storing a plurality of self-input hysteresis tables with the individual input data each time the individual operation is performed, wherein said cooperation input processing step involves informing said processing means with the input data to be initialized when a display indication of past individual input data is given from said inputting step or when a predetermined or more items of individual input data are stored in said self-input hysteresis tables and supplying said processing means with the cooperation input data from beginning up to a start of past individual operation; and wherein said self-input processing step involves performing the past individual operation by sequentially supplying said processing means with the past individual input data from the past individual operation starting location of said self-input hysteresis table.

14. A method according to claim 13, wherein said self-input transmitting step of said terminal involves transmitting, when in the individual operation mode, the individual input data of said terminal to other terminal, and wherein said cooperation input processing step of said other terminal involves storing, on receiving the individual input data, said self-input hysteresis table with the individual input data as new one individual mode, and simultaneously causing the individual input data and a name of transmitter to be displayed in form of a list of past individual mode.

15. A method according to claim 14, wherein said self-input transmitting step of said terminal involves transmitting the individual input data of said self-input hysteresis table to all other terminals which should operate in cooperation, wherein said cooperation input processing step of said all other terminals which should operate in cooperation involves writing, on receiving the individual input data, the same input data to cooperation input hysteresis table and supplying said processing means with the input data of said cooperation input hysteresis table, and wherein said switching step involves effecting a switchover from the individual operation mode to the cooperative operation mode just when completing the supply of the input data.

16. A method according to claim 9, wherein said self-input processing step, when said processing means executes multi-processes, involves starting a process exhibiting same internal status as cooperative operation oriented processing by way of individual operation oriented processing based on an indication of individual operation in said inputting step and supplying only said self-processing means with the input data from said self-inputting step.

* * * * *